US007634729B2

(12) United States Patent (10) Patent No.: US 7,634,729 B2
Lerner et al. (45) Date of Patent: Dec. 15, 2009

(54) HANDWRITTEN FILE NAMES

(75) Inventors: Matthew Lerner, Seattle, WA (US); Michael S. Bernstein, Bothell, WA (US); Gerhard A. Schobbe, Bellevue, WA (US); Jeffrey W. Pettiross, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 10/690,669

(22) Filed: Oct. 23, 2003

(65) Prior Publication Data

US 2004/0093568 A1 May 13, 2004

Related U.S. Application Data

(63) Continuation-in-part of application No. 10/291,214, filed on Nov. 10, 2002.

(51) Int. Cl.
    *G06F 17/00* (2006.01)
(52) U.S. Cl. .................. 715/268; 715/230; 715/256
(58) Field of Classification Search ........... 715/512, 715/230, 256, 268
    See application file for complete search history.

(56) References Cited

U.S. PATENT DOCUMENTS

| 5,517,578 | A |   | 5/1996  | Altman et al.          |
|-----------|---|---|---------|------------------------|
| 5,546,538 | A |   | 8/1996  | Cobbley et al.         |
| 5,561,446 | A | * | 10/1996 | Montlick ........ 345/173 |
| 5,594,640 | A |   | 1/1997  | Capps et al.           |
| 5,734,882 | A | * | 3/1998  | Lopresti et al. ...... 707/200 |
| 5,784,504 | A |   | 7/1998  | Anderson et al.        |
| 5,832,474 | A |   | 11/1998 | Lopresti et al.        |
| 5,903,667 | A |   | 5/1999  | Kuzunuki et al.        |
| 5,953,734 | A |   | 9/1999  | Tanaka                 |
| 5,991,440 | A |   | 11/1999 | Matsubayashi et al.    |
| 6,002,799 | A |   | 12/1999 | Sklarew                |
| 6,028,604 | A | * | 2/2000  | Matthews et al. ........... 715/821 |
| 6,130,962 | A |   | 10/2000 | Sakurai                |
| 6,340,967 | B1| * | 1/2002  | Maxted .............. 345/179 |
| 6,389,434 | B1|   | 5/2002  | Rivette et al.         |
| 6,389,435 | B1|   | 5/2002  | Golovchinsky et al.    |
| 6,408,092 | B1|   | 6/2002  | Sites                  |

(Continued)

OTHER PUBLICATIONS

Wilcox, L., et al., "Dynomite: A Dynamically Organized Ink and Audio Notebook", CHI 97, Mar. 1997, ACM, p. 186-193.*

(Continued)

*Primary Examiner*—Amelia Rutledge
(74) *Attorney, Agent, or Firm*—Shook, Hardy & Bacon LLP

(57) ABSTRACT

Computer systems and methods allow users to receive, save, access, and/or display handwritten information as electronic ink in objects managed by an operating system and/or that are accessible by the operating system. Such systems and methods may allow the operating system to receive, save, access, and/or display electronic ink file names, author identifiers, keywords or comments, and the like. Some examples of such systems and methods include: (a) receiving electronic ink data associated with a document or file; (b) storing the electronic ink data; and (c) providing operating system access to the stored electronic ink data. Then, whenever the file name (or other information) is displayed in an object managed by the operating system, it will be displayed in electronic ink format. Additionally, aspects of the invention relate to computer-readable media including instructions stored thereon for performing the methods and operating the systems described above.

21 Claims, 16 Drawing Sheets

U.S. PATENT DOCUMENTS

| | | | |
|---|---|---|---|
| 6,411,732 B1* | 6/2002 | Saund | 382/187 |
| 6,466,237 B1 | 10/2002 | Miyao et al. | |
| 6,493,464 B1 | 12/2002 | Hawkins et al. | |
| 6,509,912 B1* | 1/2003 | Moran et al. | 715/762 |
| 6,535,897 B1 | 3/2003 | Altman et al. | |
| 6,565,611 B1 | 5/2003 | Wilcox et al. | |
| 6,651,221 B1 | 11/2003 | Thompson et al. | |
| 6,661,920 B1 | 12/2003 | Skinner et al. | |
| 6,674,900 B1 | 1/2004 | Ma et al. | |
| 6,697,838 B1 | 2/2004 | Jakobson | |
| 6,754,386 B1 | 6/2004 | Williamson et al. | |
| 6,785,417 B1 | 8/2004 | Williamson et al. | |
| 6,798,907 B1 | 9/2004 | Clary et al. | |
| 6,877,137 B1 | 4/2005 | Ribette et al. | |
| 6,917,950 B2 | 7/2005 | McBride et al. | |
| 6,937,214 B2 | 8/2005 | Chen et al. | |
| 2002/0013795 A1* | 1/2002 | Dresevie et al. | 707/541 |
| 2003/0004991 A1 | 1/2003 | Keskar et al. | |
| 2003/0101163 A1 | 5/2003 | Lui et al. | |
| 2003/0217336 A1 | 11/2003 | Gounares et al. | |
| 2004/0017375 A1 | 1/2004 | Lui et al. | |
| 2004/0083434 A1 | 4/2004 | Fitch | |
| 2004/0093568 A1 | 5/2004 | Lerner et al. | |
| 2004/0096105 A1 | 5/2004 | Holtsberg | |
| 2005/0088464 A1 | 4/2005 | Bernstein | |
| 2005/0125225 A1 | 6/2005 | Manu et al. | |
| 2007/0053593 A1 | 3/2007 | Williamson et al. | |

OTHER PUBLICATIONS

Terry et al., "Recognizing Creative Needs in User Interface Design", C&C '02: Proceedings of the 4th conference on Creativity & Cognition, published Oct. 2002, p. 38-44.*

Walid G. Aref et al., "On Handling Electronic Ink", ACM Computing Surveys, vol. 27, No. 4, Dec. 1995.

Walid Aref et al., "The Handwritten Trie: Indexing Electronic Ink", Matsushita Information Technology Laboratory, pp. 151-162, ACM 0-8971-731—Jun. 1995.

David Bargeron et al., "Reflowing Digital Ink Annotations", vol. 5, Issue No. 1, pp. 385-392, Apr. 5-10, 2003.

David Goldberg et al., "Stylus User Interfaces for Manipulating Text", UIST'91, pp. 127-135, Nov. 11-13, 1991.

Gene Golovchinsky et al., "Moving Markup: Repositioning Freeform Annotations", UIST'02, vol. 4, Issue 2, pp. 21-29, Oct. 27-30, 2002.

Takayuki Dan Kimura, "Potentials and Limitations of Pen-Based Computers", pp. 536-540.

Barlett W. Mel et al., "Tablet: Personal Computer in the Year 2000", Communications of the ACM, vol. 31, No. 6, Jun. 1988.

Andrè Meyer, "Pen Computing", SIGCHI Bulletin, vol. 27, No. 3, Jul. 1995.

Morgan N. Price et al., "Linking by Inking: Trailblazing in a Paper-like Hypertext", ACM, pp. 30-39, 1998.

Bill N. Schilit et al., "Beyond Paper: Supporting Active Reading with Free Form Digital Ink Annotations", pp. 249-256, CHI 98, Apr. 18-23, 1998.

Lynn D. Wilcox et al., "Dynomite: A Dynamically Organized Ink and Audio Notebook", pp. 186-193, CHI 97, Mar. 22-27, 1997.

Spoerri, Souvenir: Flexible note-taking tool to pinpoint and share media in digital libraries, ACM Jul. 2002, p. 383.

* cited by examiner

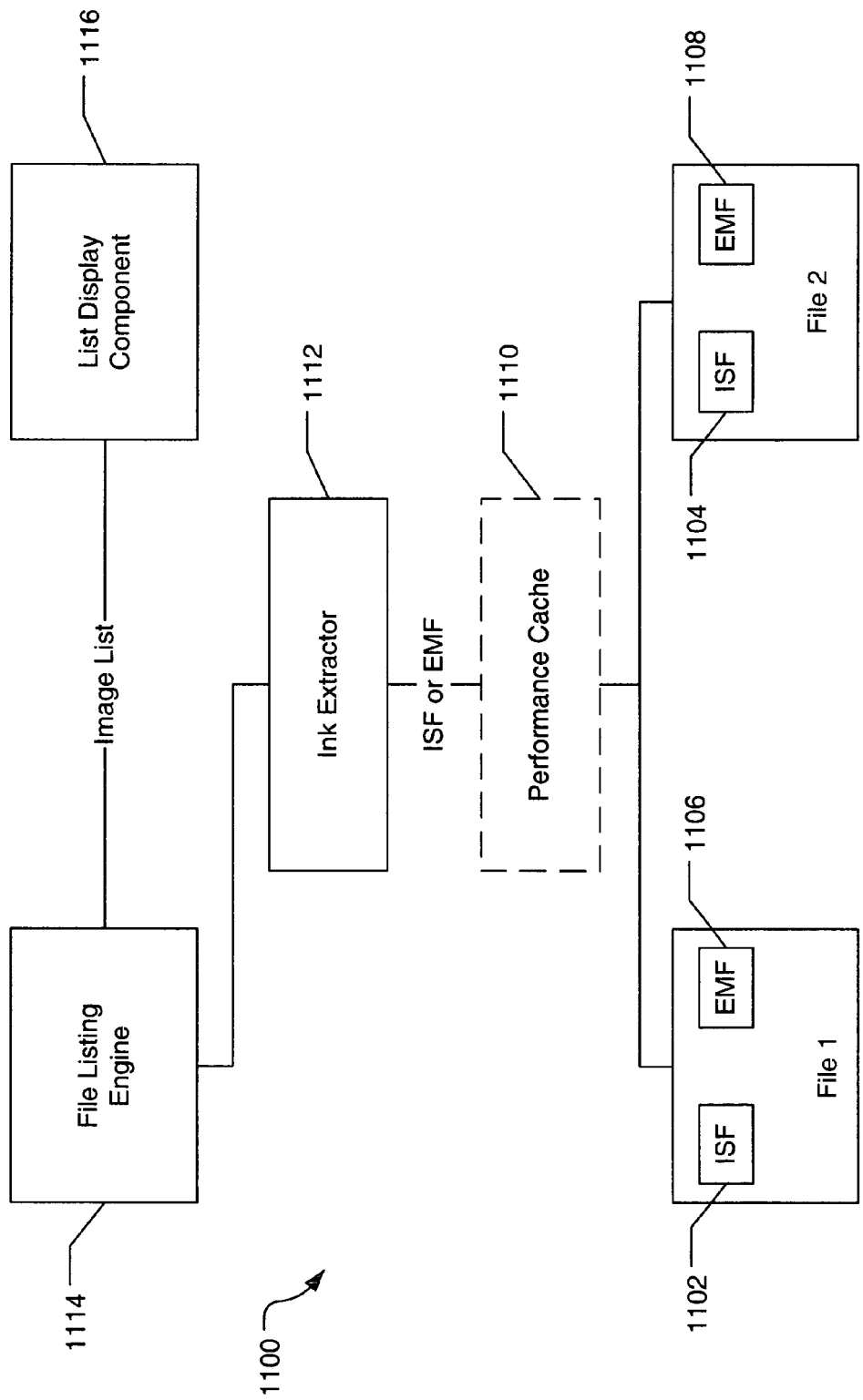

HANDWRITTEN FILE NAMES

RELATED APPLICATION DATA

This application is a continuation-in-part of U.S. patent application Ser. No. 10/291,214, filed Nov. 10, 2002, entitled "Organization Of Handwritten Notes Using Handwritten Titles," and naming Michael S. Bernstein, Vikram Madan, Gregory H. Manto, Gerhard A. Schobbe, Shawna Swanson, Kurt A. Geisel, and Steven E. Weil as inventors. This prior application is entirely incorporated herein by reference.

FIELD OF THE INVENTION

The present invention generally relates to systems, methods, and computer-readable media with computer-executable instructions stored thereon for providing handwritten file names and/or other electronic ink data for use by objects managed by a computer operating system and/or that are accessible by the operating system.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, and the like.

Recently, however, pen-based computing systems, such as tablet PCs and the like, have been increasing in popularity. In pen-based computing systems, user input is advantageously introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

Typically, with presently available pen-based computing systems, individual file names (and other information associated with a file or document) may be input in various ways, such as by using a keyboard (hard or soft) to type in the name or by entering the title as electronic ink data. When entered as electronic ink, however, the file name typically is immediately recognized and converted to machine-generated text (using handwriting recognition technology), because typical operating systems are not capable of reading and/or displaying electronic ink in all displays in which the file name may appear (such as in search result hit lists, list file display lists, recently used file display lists, etc.). Once recognized and converted, only the machine-generated text is displayed in the various objects managed by the operating system.

While the above systems are useful and desirable, some difficulties can arise. For example, users accustomed to entering data in electronic ink form may dislike using a hard or soft keyboard to enter the file name information (finding it slow or inconvenient). With respect to file names and/or other information input as electronic ink and then converted to machine-generated text, conventional handwriting recognizers do not always do a good job recognizing handwriting, particularly for file names, which do not necessarily follow a well-established dictionary or conventional grammar rules.

Accordingly, there is a need in the art for systems and methods that allow input and display of file names and/or other information in electronic ink format in objects managed by a computer operating system, while still providing searching and other capabilities available with machine-generated file names used by conventional operating systems.

SUMMARY

Aspects of the present invention relate to systems and methods that allow users to receive, save, access, render, and/or display handwritten information in objects managed by an operating system and/or that are accessible by the operating system. For example, systems and methods according to at least some examples of the invention allow the operating system to receive, save, access, render, and/or display handwritten information (e.g., in the form of electronic ink) for use as file names (e.g., for files, documents, graphics, etc. saved on or accessible by the computer system); author identifiers; keywords or comments associated with a file, document, or object; and the like. At least some examples of this invention include systems and methods that: (a) receive electronic ink data associated with a file or document saved on or accessible by a computer (e.g., via an input system); (b) store the electronic ink data (e.g., on any suitable storage system, for example, on computer-readable media accessible by the computer system); and (c) provide operating system access to at least some of the stored electronic ink data (e.g., via an ink access system that accesses the storage system). Then, whenever the file name (or other information) is displayed in an object managed by the operating system, it will be displayed in electronic ink format. Additional aspects of the invention relate to computer-readable media including computer-executable instructions stored thereon for performing various methods and/or operating various systems, including systems and methods like those described above.

BRIEF DESCRIPTION OF THE DRAWINGS

The above and other objects, features, and advantages of the present invention will be readily apparent and fully understood from the following detailed description, taken in connection with the appended drawings, in which:

FIG. 11 illustrates an example architecture that may be used in providing systems and methods according to at least some examples of this invention.

DETAILED DESCRIPTION

Figure 1:
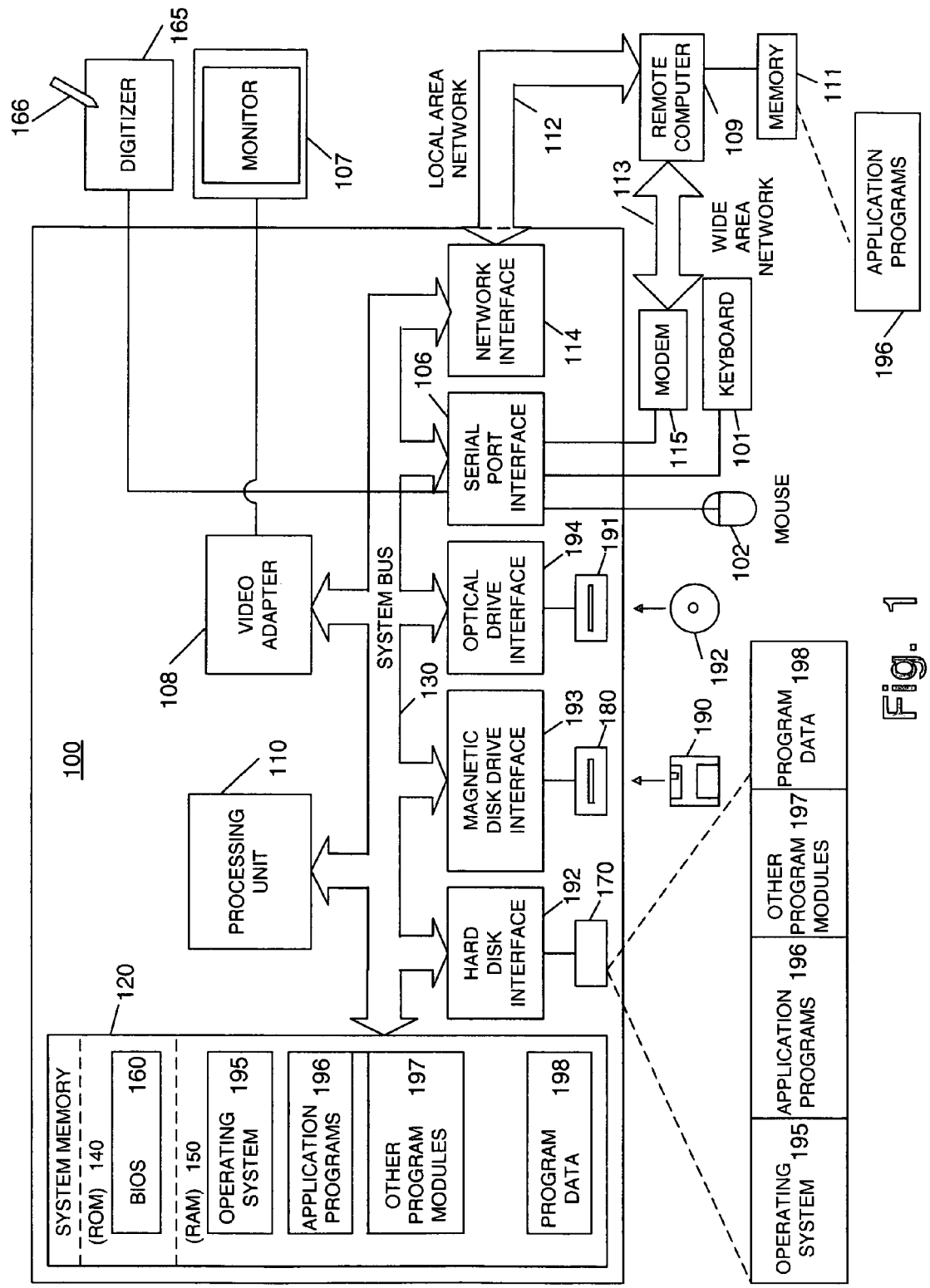
FIG. 1 illustrates a schematic diagram of a general-purpose digital computing environment in which certain aspects of the present invention may be implemented.

As described above, aspects of the present invention relate to systems, methods, and computer-readable media for receiving, saving, accessing, rendering, and/or displaying electronic ink data and/or other information in objects managed by an operating system. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. TERMS

The following terms are used in this specification and, unless otherwise specified or clear from the context, the terms have the meanings provided below:

"Operating system"—The low-level software that handles the interface to peripheral hardware, schedules tasks, allocates storage, presents a default interface to the user when no application program is running, etc. An operating system may be split into a kernel that is always present and various system programs that use facilities provided by the kernel to perform various tasks, such as higher-level house-keeping tasks, acting as servers in a client-server relationship, and the like. In at least some examples, an operating system may include a graphical user interface. Example operating systems include, but are not limited to: MS-DOS® (available from Microsoft Corporation of Redmond, Wash.); Macintosh® (available from Apple Computer, Inc. of Cupertino, Calif.); Windows® (available from Microsoft Corporation of Redmond, Wash.); NetWare® (available from Novell, Inc. of Orem, Utah); and OS/2® (available from IBM Corporation of Armonk, N.Y.).

"Application program"—Typically a complete, self-contained program that performs a specific function directly for the user. This is in contrast to system software, such as the operating system, which supports application programs. Various types of application programs are known in the art, such as spreadsheet programs, word processing programs, email management programs, scheduling or calendar programs, drawing programs, painting programs, document or file management programs, internet access and browsing programs, etc.

"Object managed by the operating system"—Any element, item, interface, dialog box, or other object that is produced, maintained, accessed, or otherwise processed by an operating system.

"Render" or "Rendered" or "Rendering"—The process of determining how information (including text, graphics, and/or electronic ink) is to be displayed, whether on a screen, printed, or output in some other manner.

"Computer-readable medium" means any available media that can be accessed by a user on a computer system. By way of example, and not limitation, "computer-readable media" may include computer storage media and communication media. "Computer storage media" includes volatile and non-volatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. GENERAL DESCRIPTION OF VARIOUS ASPECTS OF THE INVENTION

Aspects of the present invention relate to systems and methods that allow users to receive, save, access, render, and/or display handwritten information in objects managed by an operating system and/or that are accessible by the operating system. For example, systems and methods according to at least some examples of the invention allow the operating system to receive, save, access, render, and/or display handwritten information (e.g., in the form of electronic ink) for use as file names (e.g., for files, documents, graphics, etc. saved on or accessible by the computer system); author identifiers; keywords or comments associated with a file, document, etc.; and the like.

Aspects of this invention relate to computer systems and methods for receiving, saving, accessing, rendering, and/or displaying handwritten information in objects managed by an operating system of the computer. Such systems and methods may include, for example: (a) receiving electronic ink data associated with a file or document saved on or accessible by a computer (e.g., via an input system); (b) storing the electronic ink data (e.g., on any suitable storage system, for example, on computer-readable media accessible by the computer system); and (c) providing operating system access to at least some of the stored electronic ink data (e.g., via an ink access system that accesses the storage system). Computer systems and methods according to aspects of the invention further may render or display the electronic ink data as electronic ink.

The electronic ink data may include any suitable information associated with the file, document, etc., such as an electronic ink title for the file, document, etc. (e.g., a document title); an electronic ink author identification for the file, document, etc. (e.g., the document's creator, editor, etc.); an electronic ink keyword associated with the file, document, etc. (which also may include associated machine-readable text); and an electronic ink comment associated with the file, document, etc. (which also may include associated machine-readable text). This electronic ink data may be rendered or displayed in objects managed by the operating system at any suitable time without departing from the invention. For example, an electronic ink title or other electronic ink data may be rendered as part of a file list operation and/or at any other time that the title is displayed in objects managed by the computer operating system (e.g., as part of a file preview operation, in a title bar, in an application bar, in a "recently used" file listing, etc.).

Additionally, the electronic ink data may be input into systems and methods according to the invention at any suitable time and in any suitable manner without departing from the invention. For example, an electronic ink title or other electronic ink data may be input into the systems and methods as part of a "save" operation (which includes "save as" operations); as part of a "file name change" operation; as part of an "edit profile" or "create profile" operation; as part of an "add ink name" or "add ink data" operation; and the like.

Additional aspects of this invention relate to controlling data transfer and interaction between an application program and an operating system to enable the display of handwritten electronic ink titles and/or other information. Such aspects of the invention may include, for example: (a) sending data (e.g., as a request or flag) from an application program to an operating system for activation of an electronic ink entry region when storing information associated with a document or file on the application program; (b) receiving the data in the operating system; and (c) providing a user interface including the electronic ink entry region to the application program when the application program seeks to store information associated with a document or file. In at least some examples of these aspects of the invention, the data may be sent from the application program to the operating system as part of a call requesting return of the user interface and activation of a process for storing data associated with a document or file present on the application program. As an even more specific example, the data may be sent from the application program to the operating system as a flag set in a call parameter sent by the application program when it calls to the operating system for a common save dialog box for saving data associated with a document or file.

Additional aspects of the invention relate to computer-readable media including computer-executable instructions stored thereon for performing various methods and/or operating various systems, including systems and methods according to the invention like those described above.

III. EXAMPLE HARDWARE

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input (e.g, as electronic ink). Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment is one example of a suitable environment for operating systems and methods according to the invention, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
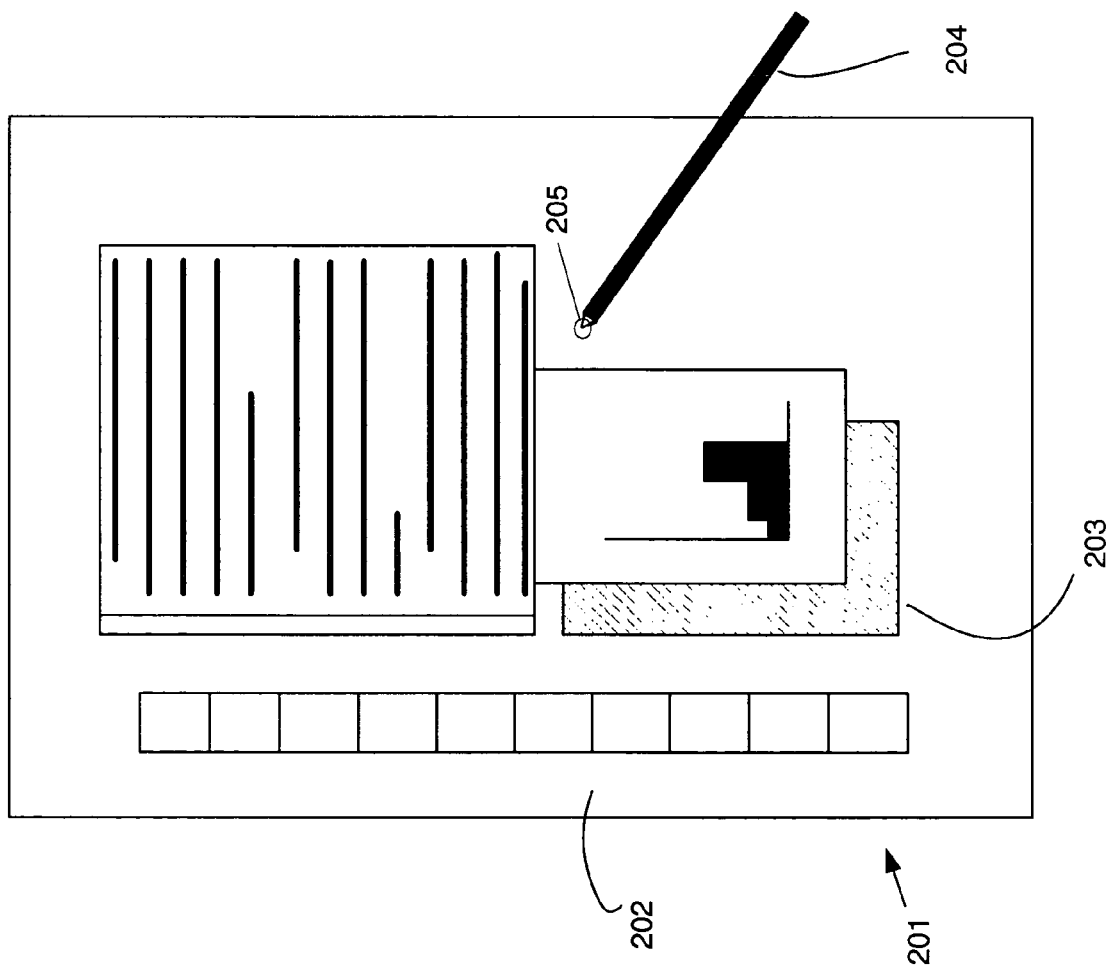
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used in the system of FIG. 2. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). As still further examples, systems may use ".NET" or DCOM (distributed component object model) as additional implementations of the ink platform. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept and/or display data as electronic ink and/or accept and/or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus.

The invention now will be described in conjunction with the remaining figures, which illustrate various examples of the invention and information to help explain the invention. The specific figures and information contained in this detailed description should not be construed as limiting the invention.

IV. EXAMPLE SYSTEMS, METHODS, AND COMPUTER-READABLE MEDIA ACCORDING TO THE INVENTION

Figure 3:
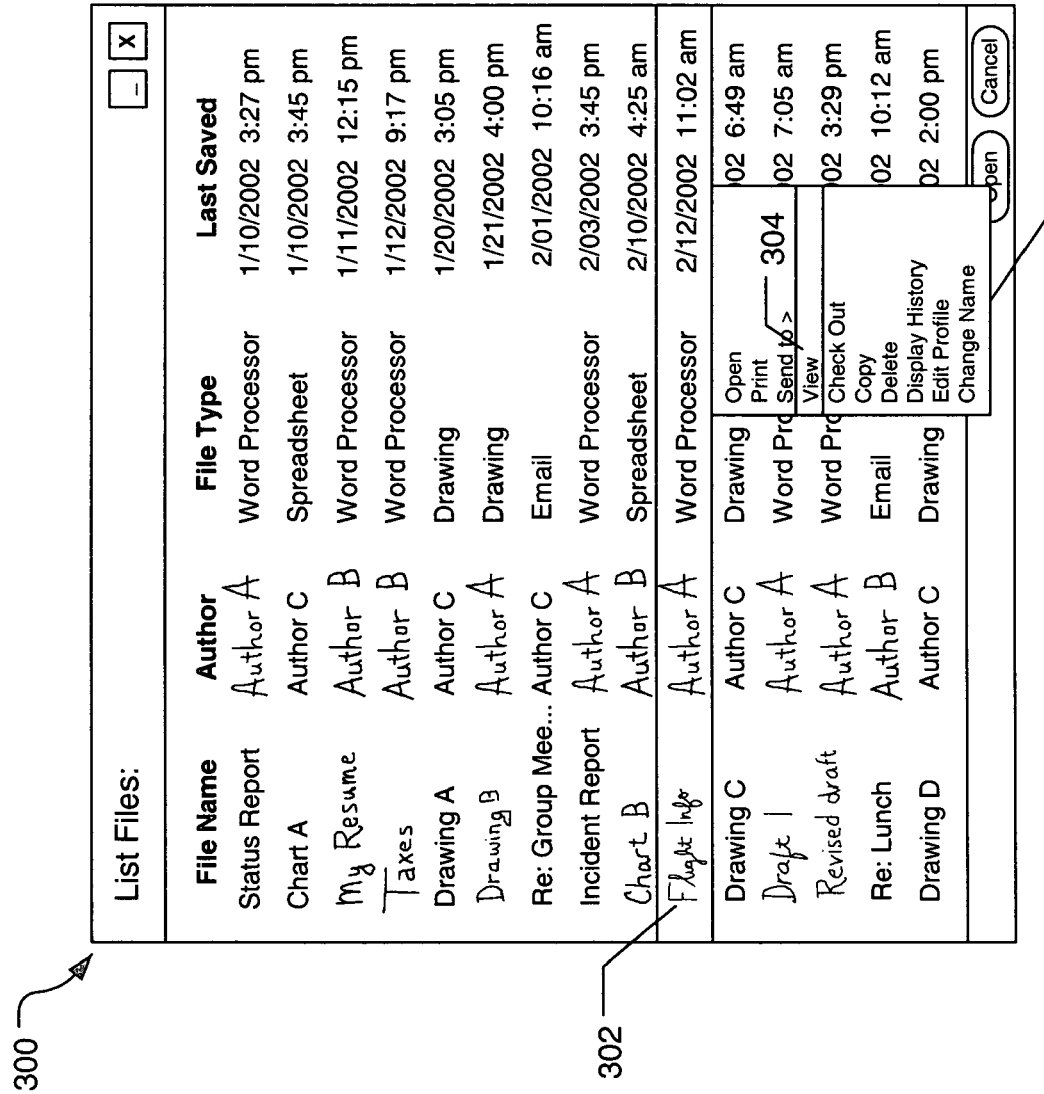
FIG. 3 illustrates an example file list display screen managed by an operating system that displays at least certain information in electronic ink form in accordance with an example of the invention.

As described above, aspects of the present invention relate generally to systems and methods for receiving, saving, accessing, rendering, and/or displaying electronic ink data and information associated with documents, files, and the like saved on and/or accessible by a computer system. FIG. 3 generally illustrates an exemplary depiction of an object managed by a computer operating system (a computer display screen 300) in which the operating system renders at least some information associated with various files or documents saved on and/or accessible by the system in electronic ink format. In one aspect of this invention, at least some file names and/or other information are displayed in objects managed by the computer's operating system as electronic ink information (e.g., as handwritten file names). As shown in FIG. 3, the file names for at least some of the files or documents created, authored, or saved by Authors A and B are displayed as electronic ink (e.g., the files named "My Resume," "Taxes," "Drawing B," "Chart B," "Flight Info," "Draft 1," and "Revised Draft," in the illustrated example). In the illustrated example, the display screen 300 is presented by the operating system in response to a "list files" type operation activated by the user. Of course, any suitable event or other action may precipitate the "list files" operation and/or otherwise result in generation of a listing of files by the operating system, such as a file search operation, a keyword search operation, a request to see a listing of recently created or recently edited documents, etc.

Notably, systems and methods according to at least some examples of the present invention are not limited to displaying only file names in electronic ink. Other information associated with the file or document also may be displayed in electronic ink. For example, as illustrated in FIG. 3, the document's "author" also may be displayed in electronic ink format. In the illustrated example, "Author A" and "Author B" have chosen to have their names displayed by the operating system in electronic ink form, while "Author C" in this example has chosen to have his/her name displayed in machine-generated text. Other information also may be displayed by the operating system as handwritten text or in electronic ink format without departing from the invention, such as keywords or comments associated with a document or file, time and date stamp information, and the like.

Once a particular format has been chosen for a document name, author name, or other information (e.g., electronic ink format or machine-generated text), the information will be displayed by the operating system using the selected format in all instances and/or in all fields in which the information is displayed. For example, electronic ink representing the "author name" may be entered into the system a single time, and each time that author's name is to be displayed by the system, it could be displayed using that previously saved electronic ink information. Additionally and/or alternatively, if desired, a user or an application program may selectively indicate and/or change the format in which the information will appear, e.g., on a document-by-document basis, on a global basis, etc. As still another option or alternative, systems and methods according to at least some examples of the invention may include a feature or option for globally disabling the ink file name display in the entire operating system, e.g., for use by those who do not desire to see the ink titles or other ink information in the various listings or other objects managed by the operating system.

Figure 4:
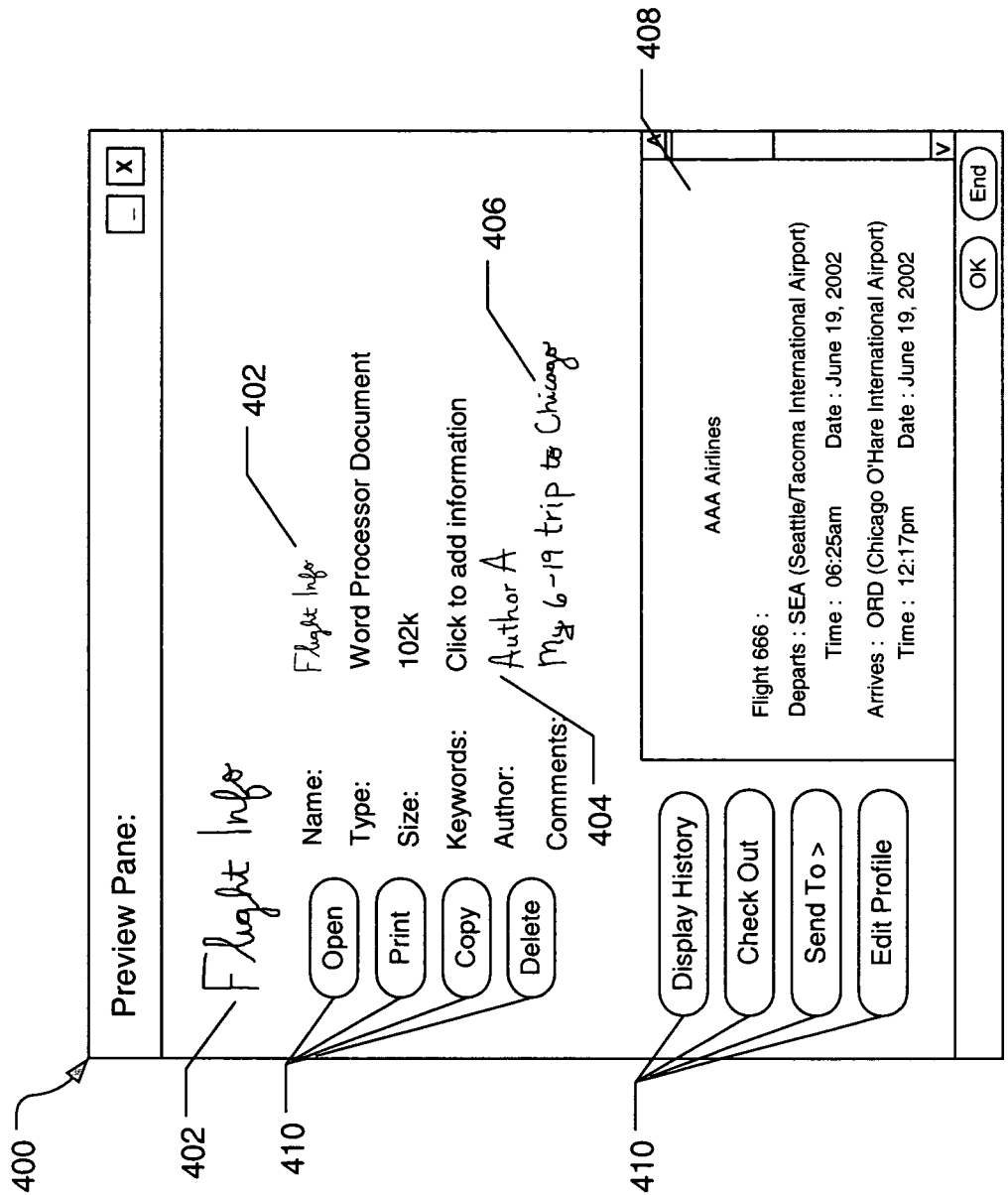
FIG. 4 illustrates an example file preview display screen managed by an operating system that displays at least certain information in electronic ink form in accordance with an example of the invention.

FIG. 4 illustrates another example depiction of an object managed by a computer operating system (a computer display screen 400 in this example) in which the operating system renders at least some information associated with various files or documents saved on and/or accessible by the system in electronic ink format. In this example, the display screen 400 provides a file "view" or "preview" function. To arrive at the display screen 400 illustrated in FIG. 4, in this example, a user has selected a file name from a listing and activated a "view" or "preview" function (e.g., by "right-clicking" on the file name "Flight Info" 302 from the listing shown in FIG. 3 and selecting the "view" (or "preview") option 304 from the list of available options). Of course, any suitable procedure or action for arriving at the display screen 400 of FIG. 4 may be used without departing from the invention.

As shown in FIG. 4, the file name (or document title "Flight Info") 402 appears in electronic ink format each place that it appears in the display 400 (as it also does in item 302 in FIG. 3). Additionally, as in FIG. 3, the "author name" associated with this document is displayed in the preview panel of FIG. 4 in electronic ink format (as shown at reference number 404). Additionally, in the illustrated example, electronic ink comments 406 have been provided and associated with this file. A separate panel 408 in the display 400 allows the user to view (or preview) the actual content of the document without the need to open it. Of course, any suitable or desired information may be displayed in the preview screen 400 without departing from the invention (such as file size, creation date, last edit date, edit history, last viewing, parties editing or viewing, etc.). Additionally, any suitable or desired functions may be accessible through the preview screen 400 without departing from the invention, including, for example, the various functions illustrated by icons 410 in FIG. 4.

Figure 5:
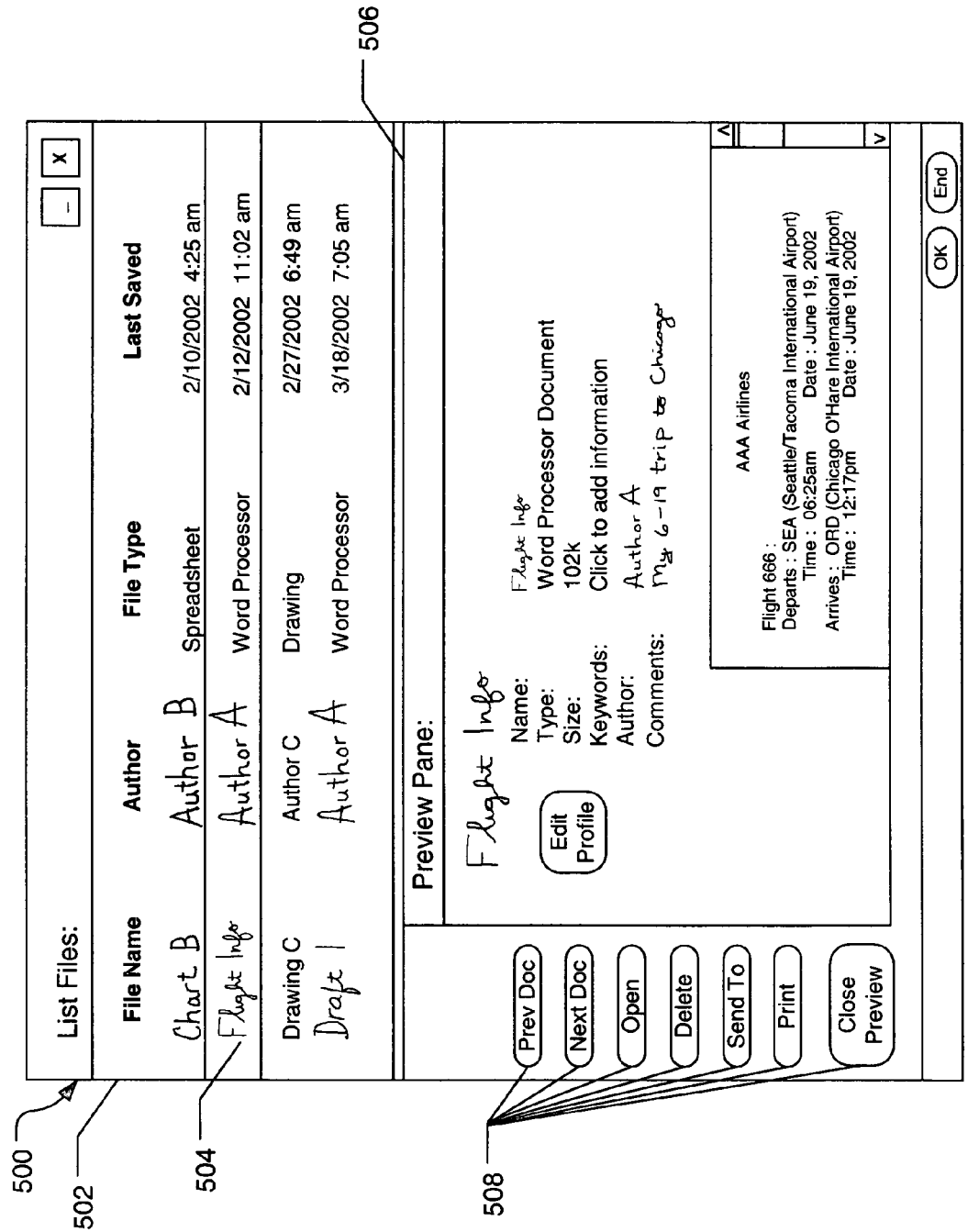
FIG. 5 illustrates an example display screen managed by an operating system that both displays a file list (or portion thereof) and allows the user to view preview information associated with a file in accordance with an example of the invention.

FIG. 5 illustrates another exemplary depiction of an object managed by a computer operating system (e.g. a display screen 500 in this example) in which at least some information displayed by the operating system is presented in electronic ink format. The display screen 500 of FIG. 5 constitutes essentially a combination of the content displayed in FIGS. 3 and 4. In this illustrated example, when the "view" option 304 is selected (e.g., from a file listing screen as described above in conjunction with FIG. 3), the top half 502 of the display screen 500 remains as the file listing (with the selected file 504 displayed) and the bottom half of the display screen 500 provides a preview pane 506. Various functions can be activated from the display screen 500, as illustrated by example icons 508 in FIG. 5. Of course, any suitable or desired functions and/or information can be provided, accessible through and/or available on the display screen 500.

Figure 6A:
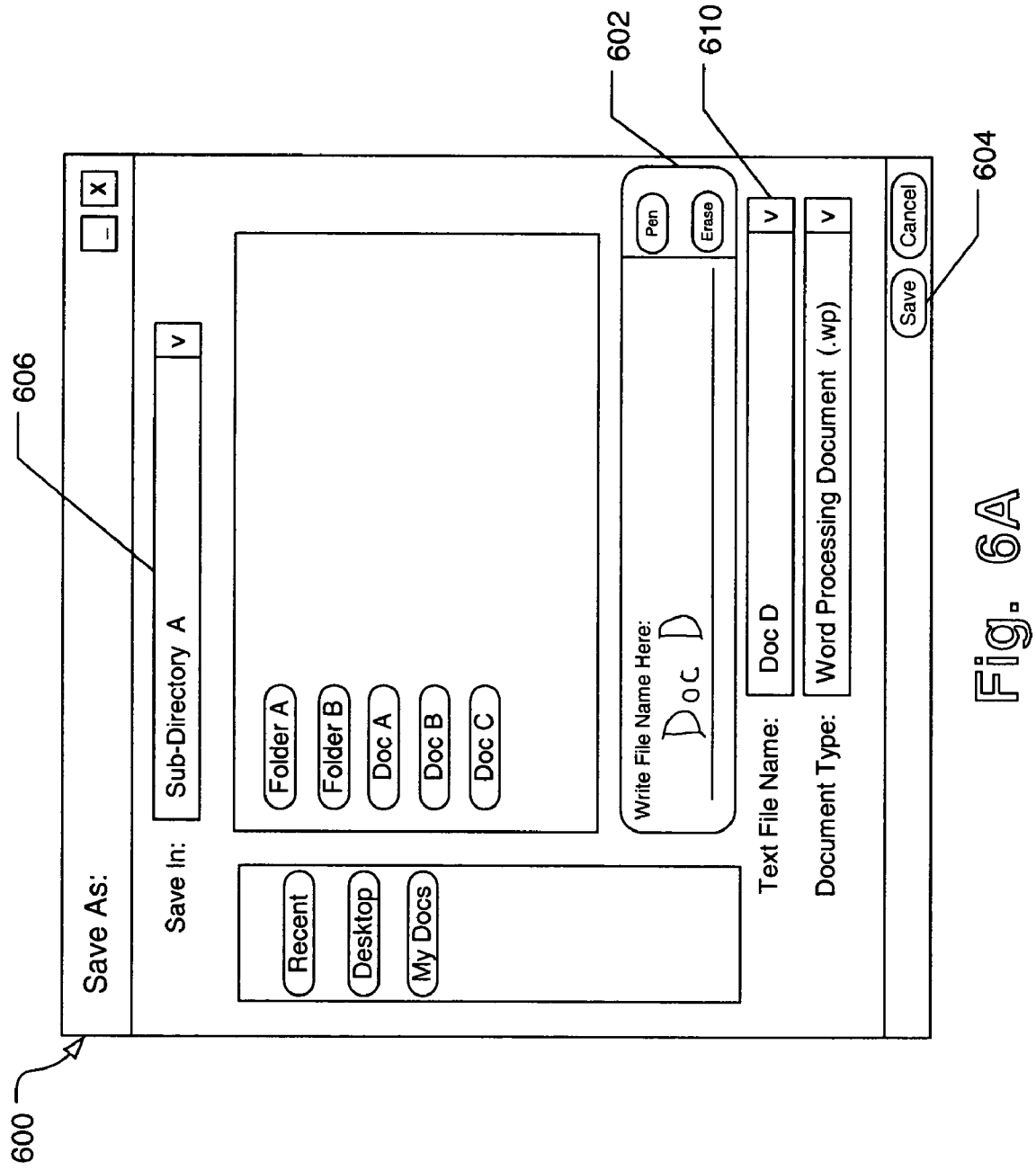
FIGS. 6A and 6B illustrate an example "save as" or "save" operation managed by an operating system in accordance with an example of the invention.
Figure 6B:
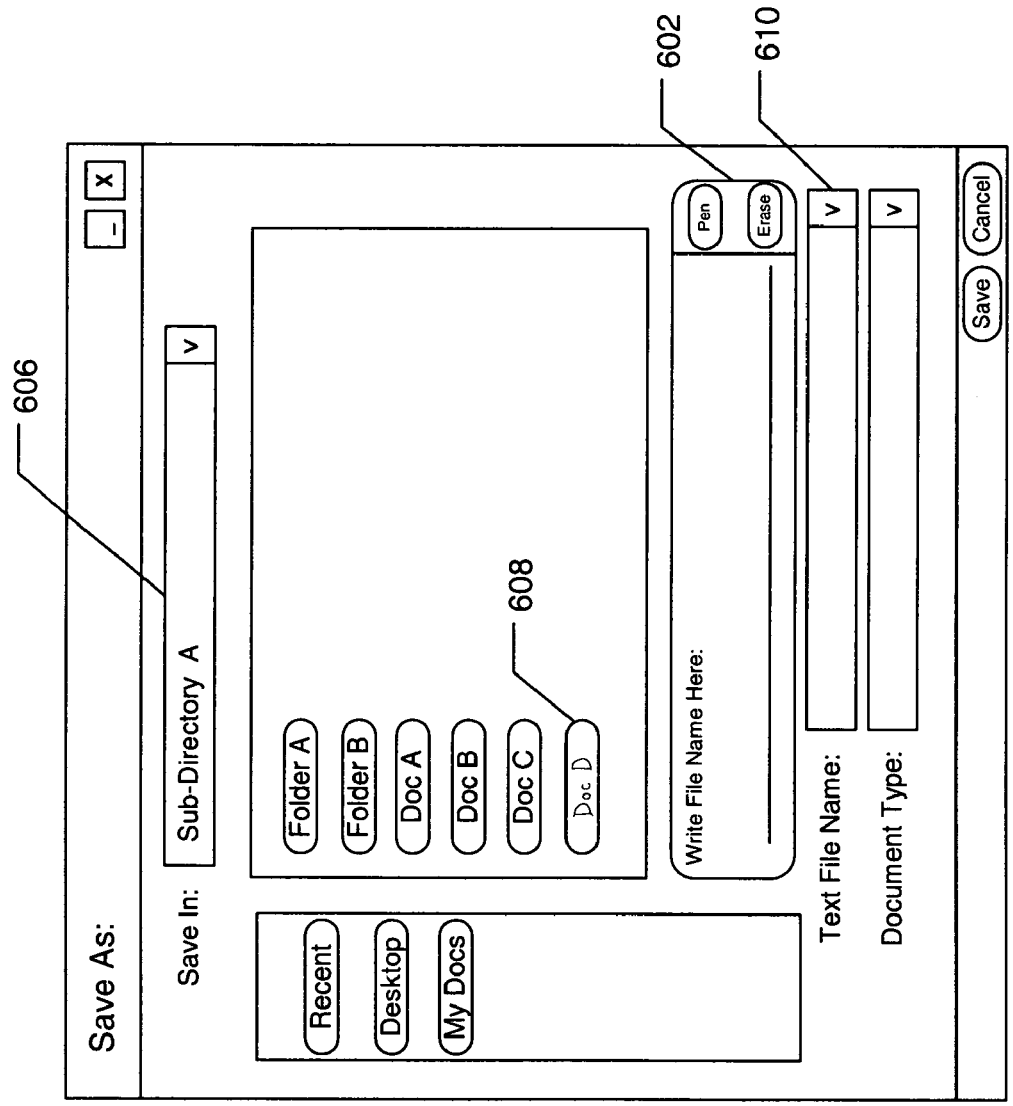

FIGS. 6A and 6B illustrate an example of how electronic ink data is entered into systems and methods for later display in objects managed by the operating system according to at least some examples of this invention. In this example, once a document or other data has been prepared and/or otherwise downloaded or made available on the computer system, the user decides to save this data as a new document or file (e.g., on the computer's hard disk drive, on a floppy disk, on a network, or in any other suitable or desired computer-readable storage medium). Accordingly, the user issues a "save as" or "save" command to the system. This prompts display of a "save" box or screen, an example of which is illustrated as display box or screen 600 in FIG. 6A (display box or screen 600 also may be referred to as a "save dialog box" in this application).

In this example, the application program calling the save dialog box 600 (e.g., an ink input program, a word processing program, a spreadsheet program, an internet browser program, etc.) has (at some time) provided data to inform the operating system that the user may desire to enter and/or display file names for documents or files stored from this application program in an electronic ink format. This may be accomplished at any suitable time, for example, when the application program is initially downloaded onto the computer, when the save dialog box is called, and/or at any other suitable time (e.g., by changing the "properties," "preferences," and/or "options" associated with the application program, by sending a "show inking area" flag to the operating system, etc.). Accordingly, when the save dialog box 600 appears in this example, it includes an "inking region" 602 in which the user can enter a name for the document or file in electronic ink format (e.g., using a stylus or electronic pen associated with a pen-based computing system). In the example illustrated in FIG. 6A, the user has written "Doc D" in the inking region 602 using a stylus. Then, when the "save" icon 604 is selected (e.g., by tapping the stylus in the icon 604 or in another suitable manner), the document is saved under the handwritten file name "Doc D" in "Sub-Directory A" (see sub-directory bar 606) as written by the user (the text name (if any) also is saved). Accordingly, the next time the contents of this sub-directory 606 are displayed, an icon for the file "Doc D" with a handwritten file name will appear in the sub-directory 606, as illustrated by icon 608 in FIG. 6B.

The electronic ink data corresponding to the handwritten ink title also can be sent automatically to a handwriting recognition engine, and the handwriting will then be recognized by systems and methods according to at least some examples of this invention. Any suitable or desired handwriting recognition engine or software may be used without departing from the invention, including, for example, the handwriting recognizer included and used in Microsoft Corporation's Windows XP Tablet PC Edition™ platform/operating system software. Once recognized, machine-generated text corresponding to the recognized handwriting may then appear automatically in the save dialog box, for example, in the "text file name" box 610 shown in FIG. 6A. In actuality, systems and methods according to at least some examples of the invention will actually save the file using the recognized, machine-generated text name, and the electronic ink data obtained via ink input region 602 will be associated with the file or document as metadata. The system can then use the machine-generated text name for various conventional actions, such as sorting, searching, and the like. If the handwriting is incorrectly recognized by the handwriting recognition system (e.g., if the wrong words appear in the text file name box 610 after recognition), the user may be given an opportunity to correct the recognized text, for example, by tapping or clicking in text file name box 610 and making corrections using a soft or hard keyboard or mouse, by selecting the correct term or terms from a list generated by the handwriting recognition engine, or in any other desired or suitable manner, without departing from the invention. Optionally, if desired, the user may enter text in text file name box 610 that does not correspond to the handwritten information entered in inking region 602 without departing from the invention. For example, in the example shown in FIG. 6B, if desired, the handwritten ink name could be "Doc D" as shown, but the user could type in a different text file name in box 610 (such as "Revised Draft II"), using a hard or soft keyboard. As another example, the ink name may include a symbol, drawing, or other graphic element that is not immediately recognizable by a handwriting recognizer, but the user could also enter a text title in box 610 that the system will use to store and sort the file name.

In a similar manner, other electronic ink data associated with the document or file (such as the author name, comments, keywords, and the like) may be stored as metadata associated with the document or file, and the data may be recognized by a handwriting recognition engine and stored. If desired, the save dialog box 600 may include inking regions for adding ink corresponding to this additional information. Alternatively, additional dialog boxes may be called (e.g., from a suitable menu or other interface) that will allow entry of this additional information.

Figure 7A:
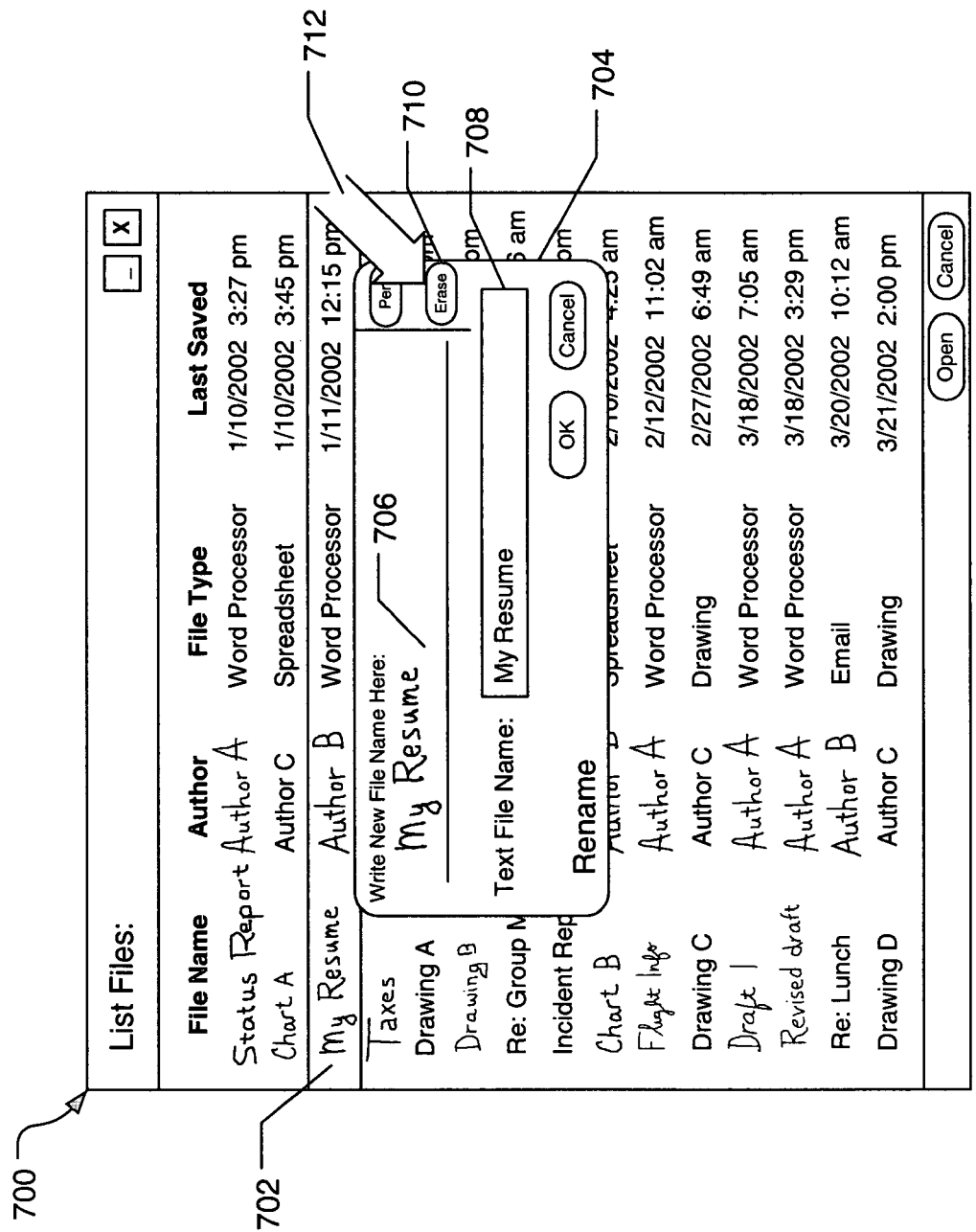
FIGS. 7A through 7C illustrate an example file "rename" operation managed by an operating system in accordance with an example of the invention.
Figure 7B:
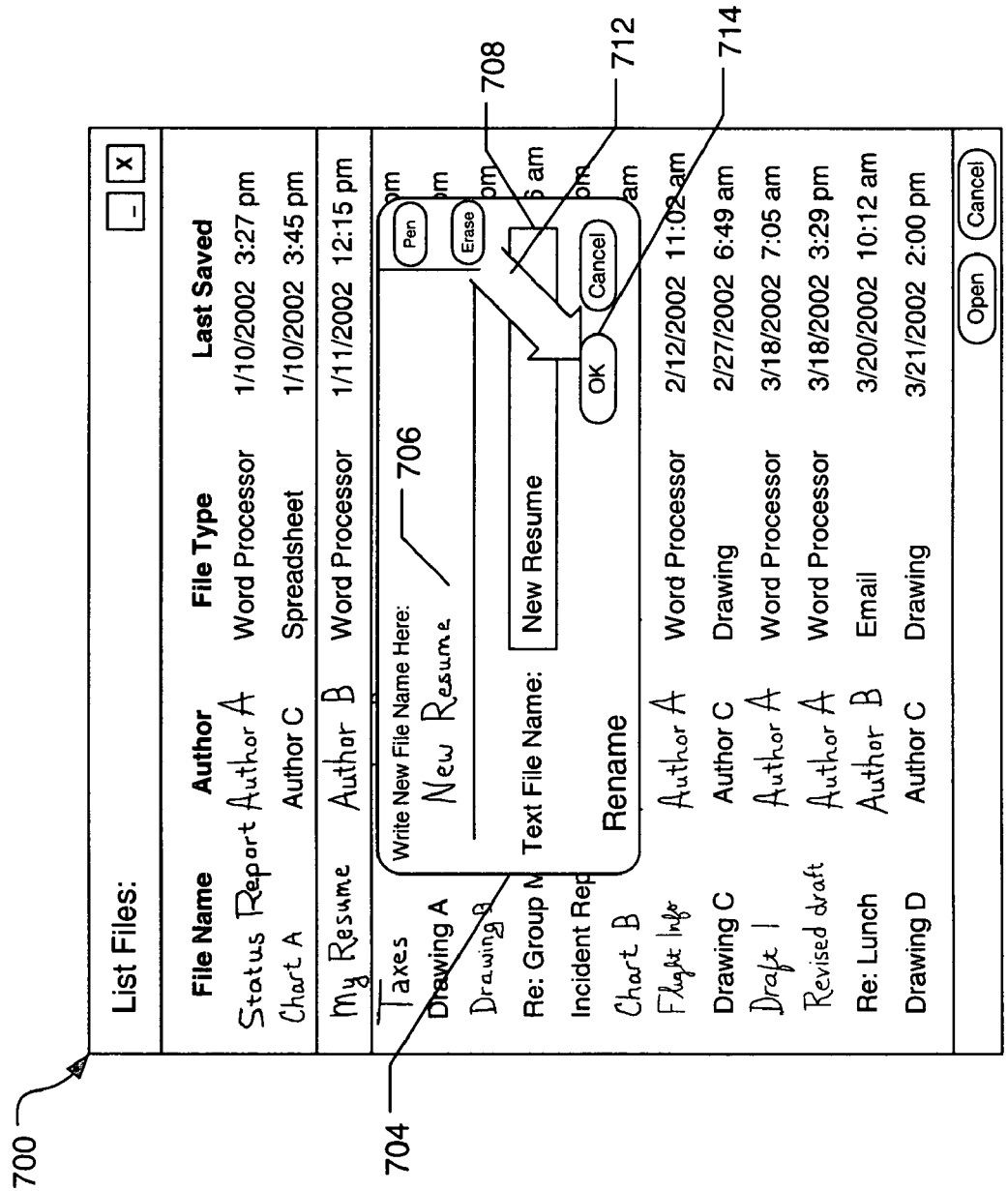
Figure 7C:
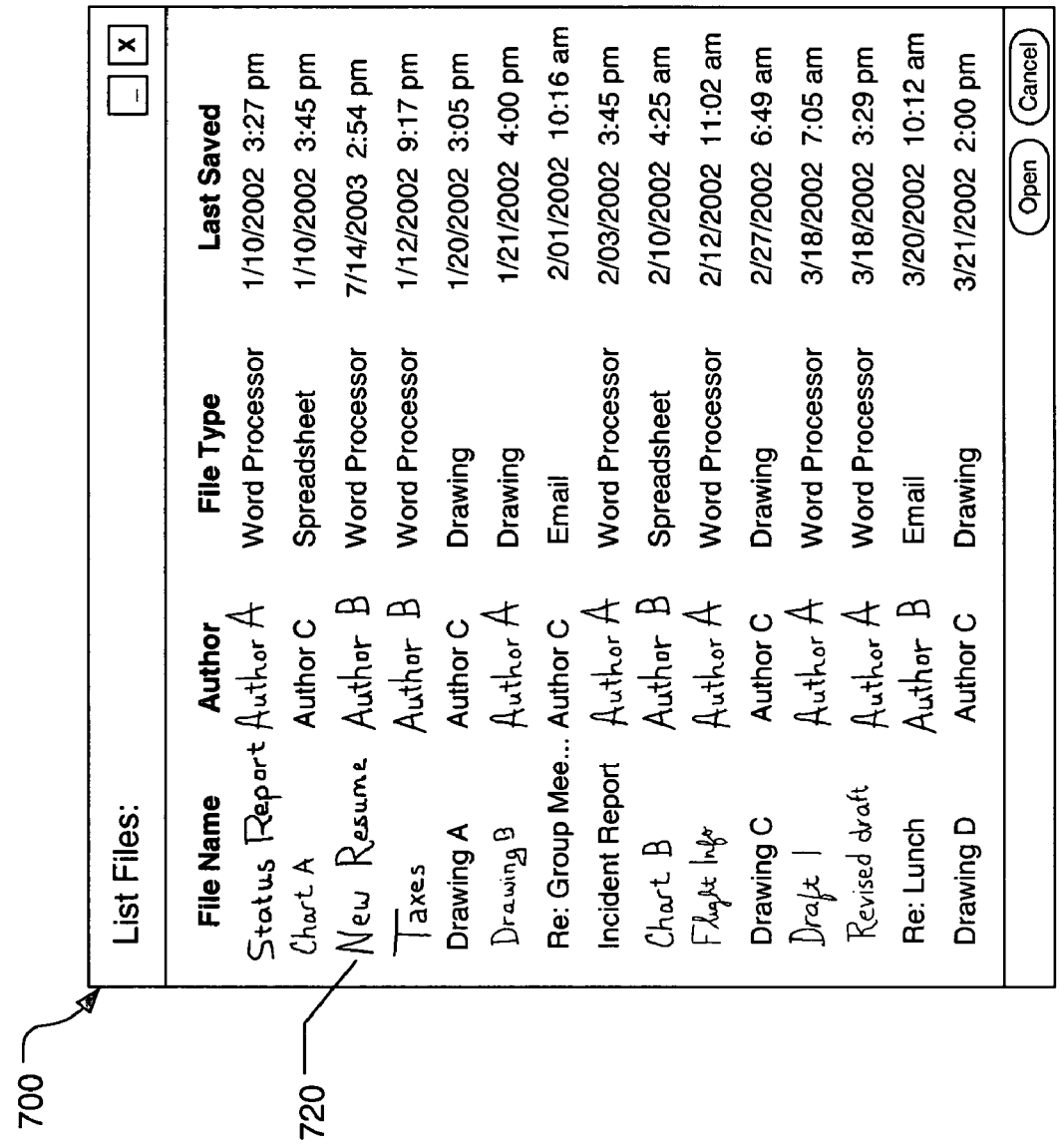

FIGS. 7A through 7C illustrate another aspect or feature present in at least some examples of this invention. More specifically, these figures illustrate the ability of systems and methods according to at least some examples of the invention to change a handwritten title or file name associated with a document or file. FIG. 7A illustrates an exemplary display screen 700 managed by an operating system as it might appear after a "list files" or "search" operation has been performed by the operating system and/or by an application program present on or accessible through the operating system. In addition, as illustrated in FIG. 7A, the user has selected a file having an electronic ink or handwritten file name (the file "My Resume" 702 in this example). For example, by selecting file 702 using a "press-and-hold" action with the stylus (i.e., touching the stylus down on the file name 702 and holding it steady for a predetermined time period, which is akin to a right mouse button click with a conventional mouse), a menu will appear like the menu 306 shown in FIG. 3. Then, by selecting the "change name," "edit profile," or other suitable or desired option from menu 306 (e.g., by tapping or touching the stylus on the selected option in menu 306), a user interface or dialog box will appear that enables the user to perform the name change operation. In the illustrated example of FIG. 7A, activation of the user interface in this manner will cause a file name change interface box 704 to appear. When it initially appears, the file name change interface box 704 will include the original ink and text file names (in areas 706 and 708, respectively). If desired, the user can correct handwriting recognition errors by tapping the stylus in box 708 and making the necessary corrections (e.g., using an associated soft or hard keyboard).

If the user desires to change the handwritten title, he or she can first erase the existing title, e.g., by tapping on the erase button 710 using the stylus (as indicated in FIG. 7A by arrow 712). This action will erase the handwritten title from box 706 (alternatively, it may change the stylus to act as an eraser, and the user then can selectively erase some or all of the existing title). Optionally, if desired, this action also can erase the machine-generated title from text file name box 708, or this action can occur later, for example, after a new title is handwritten. Once erased, the user can write a new title for the document in box 706. For example, as illustrated in FIG. 7B, after erasing the original title ("My Resume"), the user has written the new title "New Resume" in ink input box 706. Completion of the title (e.g., after a predetermined time period or activation of an icon on the interface) prompts the handwriting recognition engine to recognize the new title, and the recognized title then appears in box 708. If necessary or desired, the user can change the machine-generated title stored in association with the document, e.g., to correct recognition errors, to add a different machine-generated title, etc. Once the user is satisfied with the new handwritten and/or recognized title(s), he or she can tap on the "OK" button 714 using the stylus (represented in FIG. 7B by arrow 712), which prompts the system to save the new title. The name change interface box 704 will then disappear, and the title will changed to the new title 720 in display 700, as illustrated in FIG. 7C.

Figure 8A:
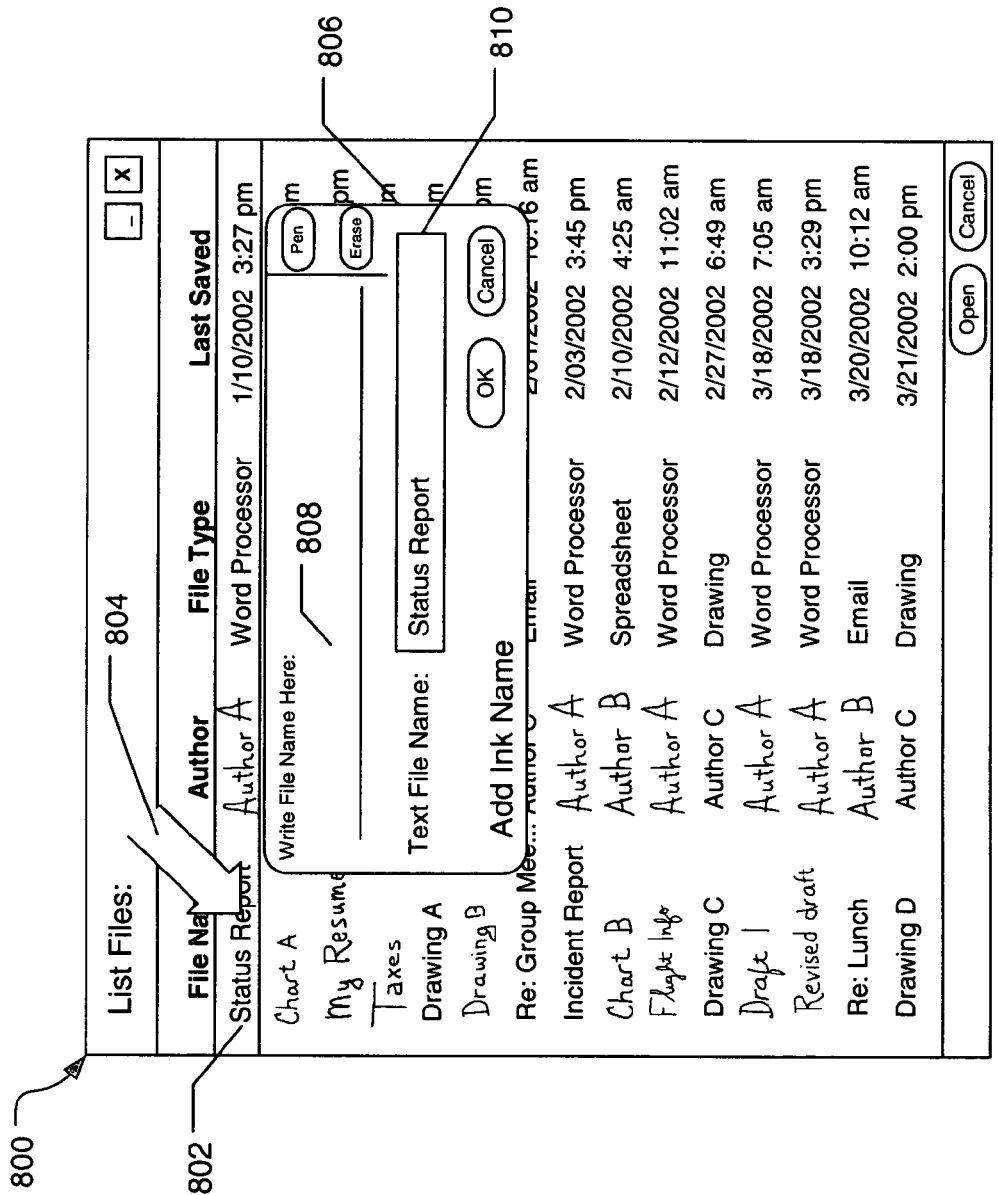
FIGS. 8A through 8C illustrate an example "add ink file name" operation managed by an operating system in accordance with an example of the invention.
Figure 8B:
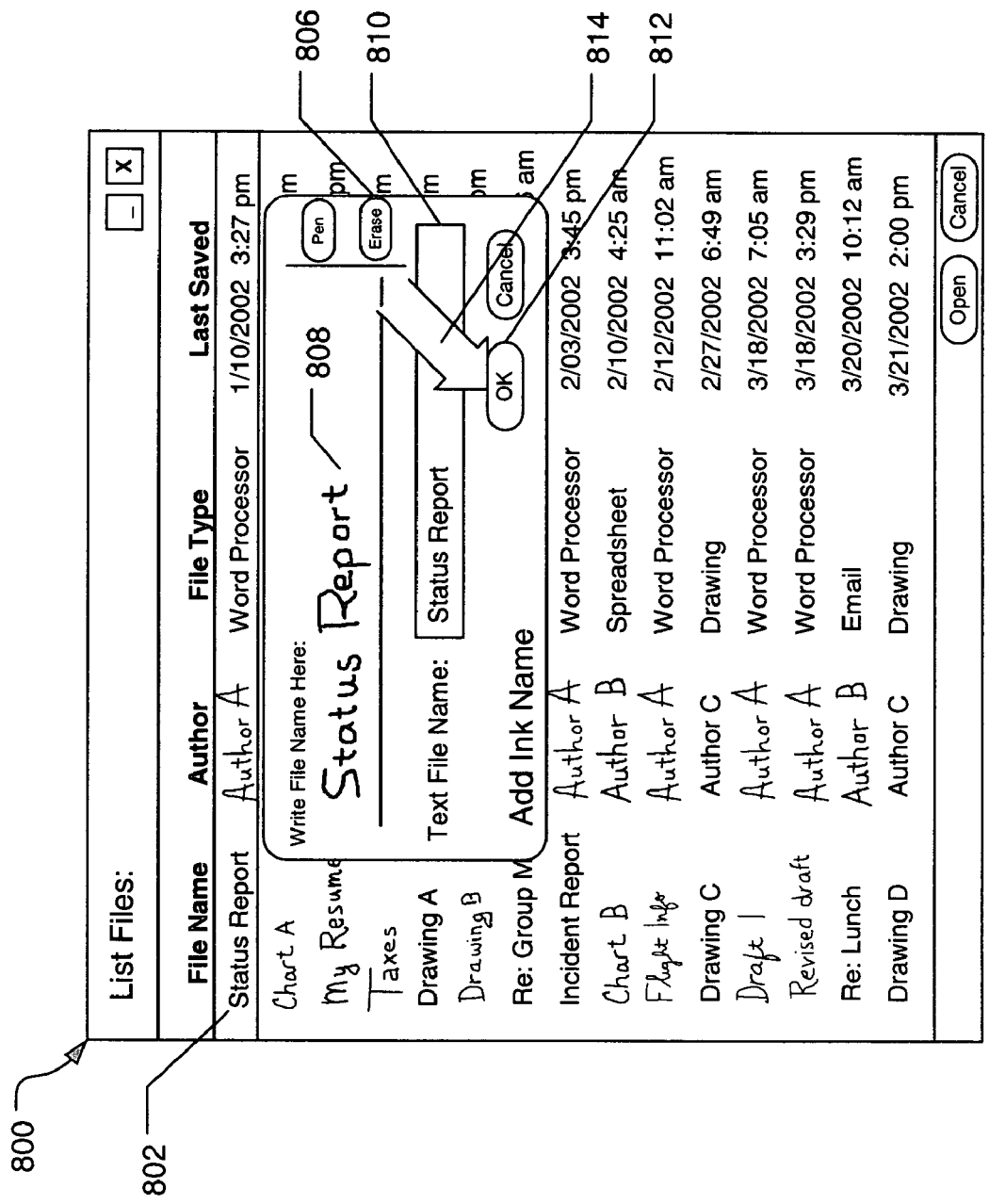
Figure 8C:
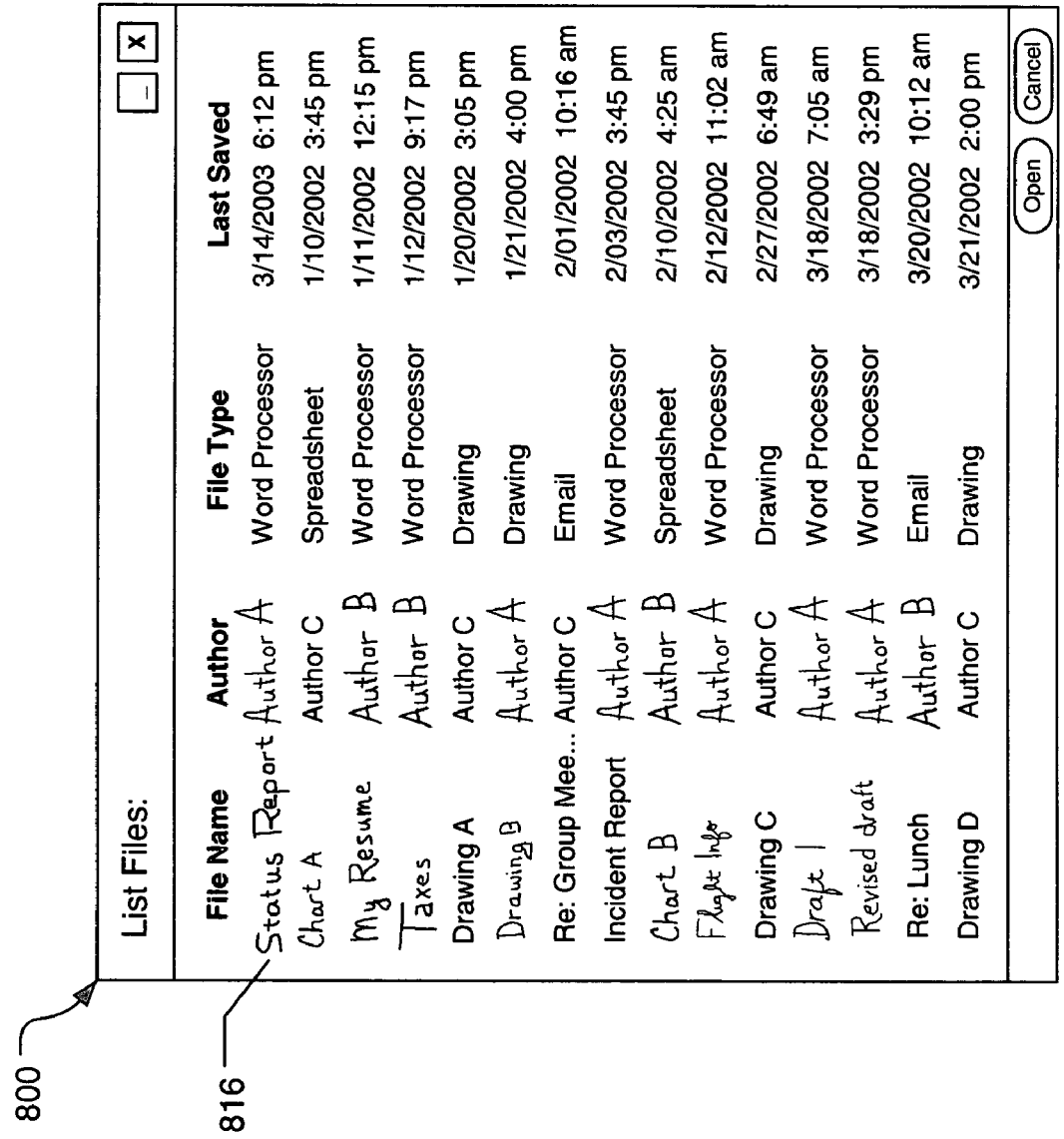

FIGS. 8A through 8C illustrate an exemplary interface that enables the addition of an ink name to a file that previously had only a machine-generated text name. As shown in FIG. 8A, after a "list files," search, or other suitable operation, a display screen 800 appears listing several files saved on or otherwise available over the computer system. In this instance, the user decides to add an electronic ink file name to the document 802 entitled "Status Report." This may be accomplished, for example, by selecting document 802 with a stylus using a "press-and-hold" action (represented by arrow 804), which generates an available action menu (akin to menu 306 discussed above), and then selecting a proper item from that menu that enables addition of an ink name (e.g., an "add ink name" icon, a "save" or "save as" operation, an "edit profile" operation, etc.) The above action causes an add ink name interface box 806 to appear, as illustrated in FIG. 8A. As illustrated, when the add ink name interface box 806 appears in this example, there is no handwritten name in the ink area 808 (because no handwritten name existed that was associated with document 802), but the machine-generated name "Status Report" appears in the text file name box 810.

Then, as illustrated in FIG. 8B, the user enters an ink title into the inking area 808 using a stylus. While in the present example, the user wrote the same title as the previously present machine-generated title, this is not a requirement. Rather, any ink title may be entered without departing from the invention. Also, systems and methods according to at least some examples of the invention may be designed to recognize the new handwritten name and (if necessary) to change the machine-generated title in text file name box 810 to match the new recognized name. Alternatively, if desired, the original machine-generated title in box 810 may remain unchanged, optionally until the user prompts the system to recognize the new handwritten title. Once the user is satisfied with the handwritten and machine-generated titles, he or she can tap the stylus on the "OK" button 812 (as represented by arrow 814), which then replaces the machine-generated title 802 with the handwritten title 816 in the interface screen 800, as illustrated in FIG. 8C.

Of course, many variations and modifications in the specific displays, the actions activating the various displays, and the other actions described above in conjunction with the save, name change, and ink name addition operations of FIGS. 6A through 8C may be used without departing from the invention. Specifically, any suitable displays, interface boxes, and processes that allow saving, changing, adding, and/or otherwise manipulating handwritten and/or machine-generated names associated with a file or document name and/or other information can be used without departing from this invention.

Figure 9:
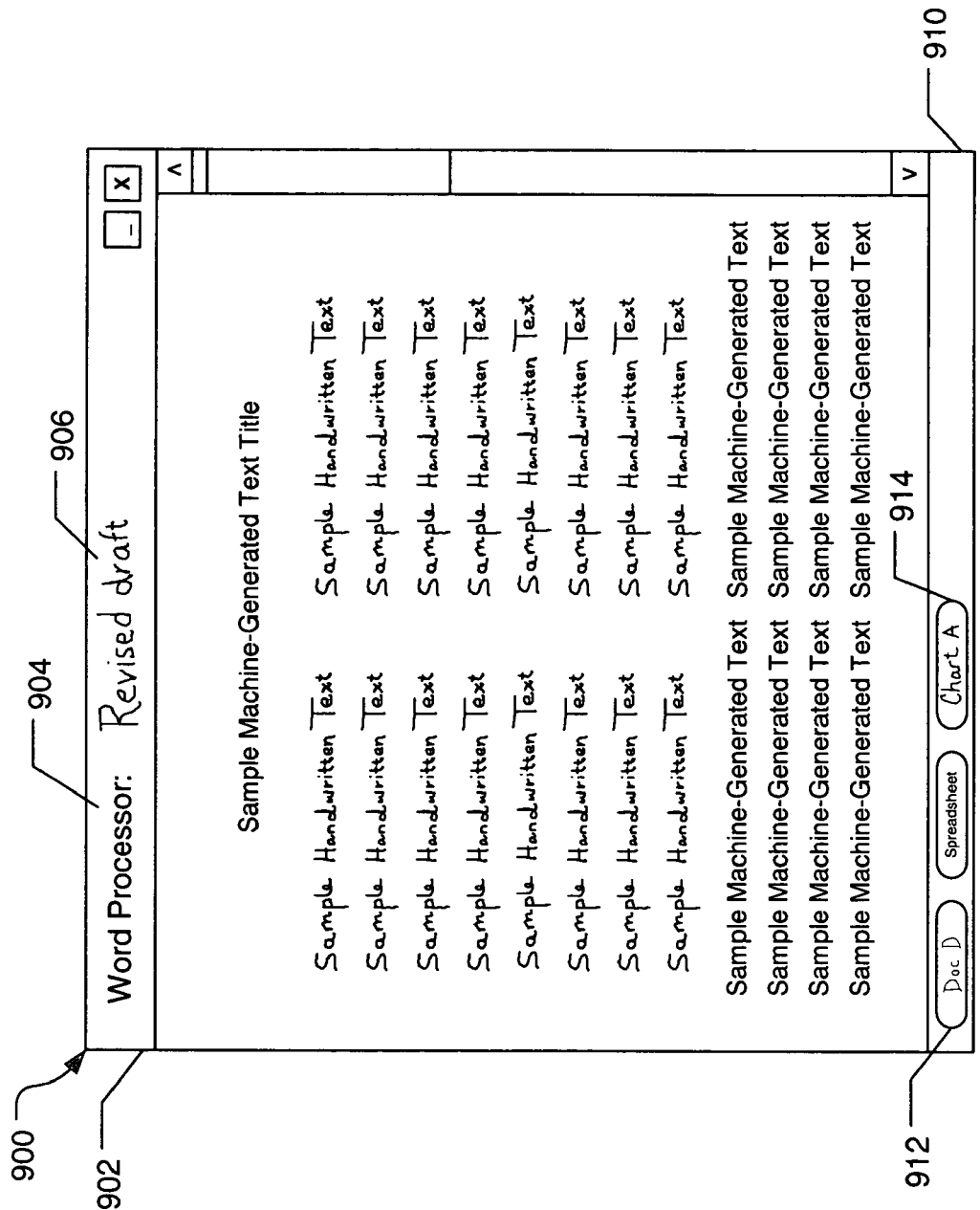
FIG. 9 illustrates examples of other places where file names and/or other information in electronic ink form may appear in accordance with various examples of this invention.

FIG. 9 illustrates additional examples of objects managed by an operating system that may include file or document names and/or other information associated with a file or document in handwritten electronic ink. For example, FIG. 9 illustrates a computer screen 900 on which an operating system is operating and an application program (called "Word Processor" in the illustrated example, although operation of any type of application program is possible) is running on the computer. As illustrated, the word processing program of this example may accept, display, manipulate, and/or otherwise process electronic ink data as well as machine-generated text. Of course, the application program could accept, display, manipulate, and/or otherwise process any desired or suitable other types of data, including, for example, graphics, tables, drawings, spreadsheet data, etc.

Notably, in the title bar 902 on the display screen 900, the operating system of the computer displays both the application program name 904 ("Word Processor" in this example) and the specific file name 906 that is open on the display ("Revised draft" in this example). Because this specific document had been stored with an electronic ink file name, the operating system displays the document title 906 in the title bar 902 in electronic ink format.

Of course, the operating system and/or application program may dictate inclusion of any other suitable or desired ink information in the title bar 902 without departing from the invention. For example, a digital signature-capturing program may desire to show the last captured signature in the title bar 902. As still additional examples, the name of the author of the open document in the application program, its creation date, its last edit or save date, or the like may appear in electronic ink format in the title bar 902, if desired. Many combinations and variations in the displayed ink information are possible without departing from the invention.

FIG. 9 illustrates still additional areas in which document titles or other information might appear in electronic ink format. As illustrated, the application bar 910 at the bottom of display screen 900 indicates that several additional documents have been opened by the user on the system. The titles in the icons for two these documents, namely icon 912 for "Doc D" and icon 914 for "Chart A," appear in electronic ink form because electronic ink formatted document titles have been saved for these documents.

In essence, systems and methods according to at least some examples of this invention will allow electronic ink titles and/or other electronic ink information to be associated with specific electronic documents or files and stored (e.g., as metadata associated with the document or file). Once stored, the electronic ink title and/or other information can be accessed, used, and rendered by the operating system wherever and whenever it appears on the system. Of course, if desired, application programs and users can be given various options that dictate how the file names will appear when rendered by the operating system. For example, application programs and users can be given the ability to dictate whether ink titles will be used for a specific program and/or document, the circumstances under which the ink title will be used in preference to a machine-generated title, and the like.

Figure 10:
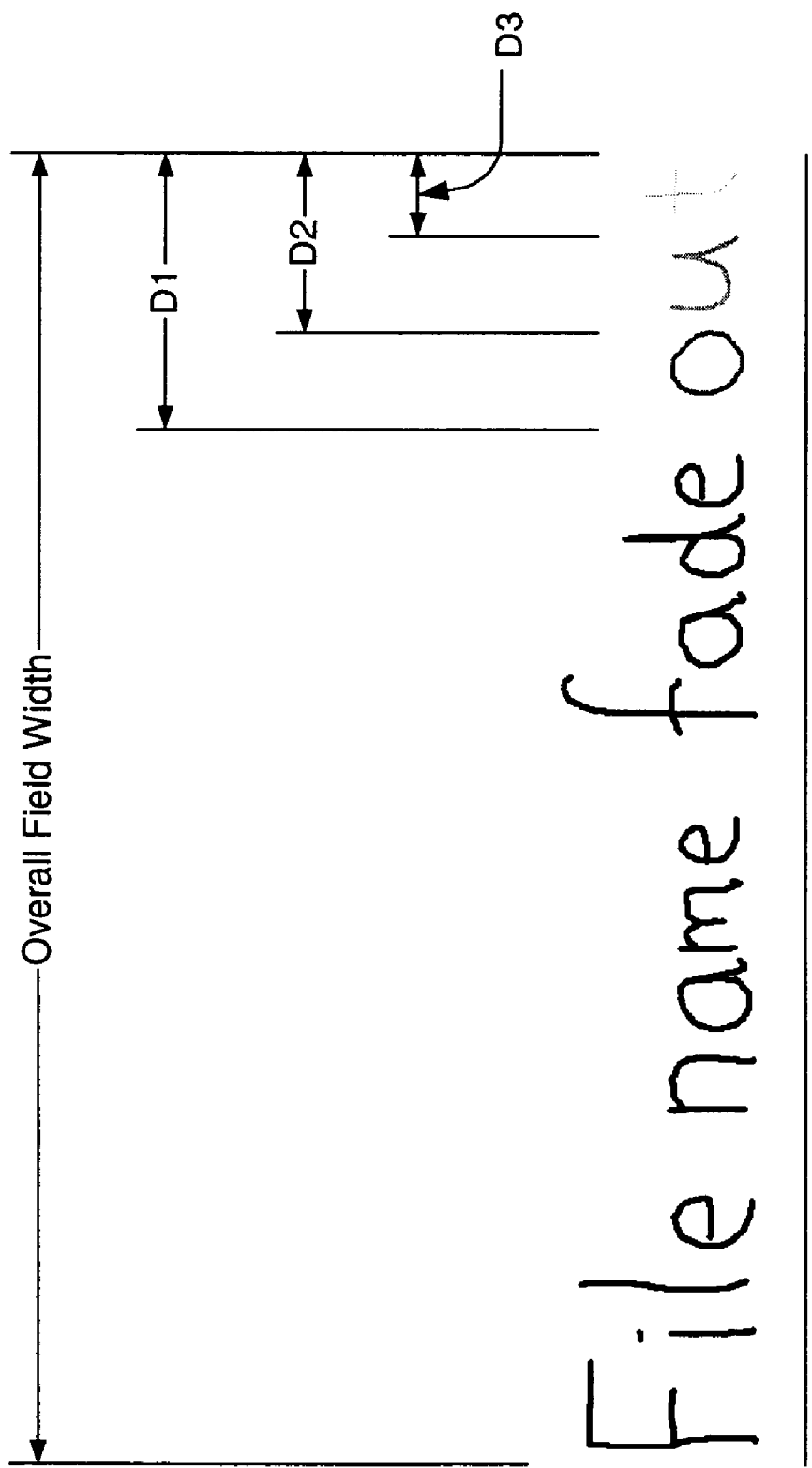
FIG. 10 illustrates an example of fading out the display of a file name that may be used in at least some examples of the invention.

FIG. 10 illustrates one optional way of displaying ink titles and other information within fields having restricted lengths and the like. When titles or other information are displayed as machine-generated text, if the width of a title or the other typewritten information exceeds the width allotted in the field, the name (or other information) typically will be truncated in some manner. For example, in some instances, the name or other information will be truncated at a certain width and the remainder will be replaced with an ellipsis (e.g., the three dots ". . . ") to indicate that additional information is present. As another alternative, the name or other information may simply be truncated.

FIG. 10 illustrates an aesthetically pleasing way of truncating a handwritten file name (or other handwritten information) when its length exceeds the overall available field width. Specifically, in the illustrated example, the ink appears in a constant color over the majority of the overall field width. However, at some distance before the end of the field (distance "D1" in FIG. 10), the ink will become somewhat lighter. Optionally, the ink may become lighter still as it gets closer to the end of the field width (distances D2 and D3 in FIG. 10) until it finally fades out and is not visible at the very end of the available field width. Alternatively, rather than lightening the ink in one or more discrete steps, as shown in FIG. 10, the ink may become constantly lighter over some portion of its length (e.g., over distance D1) without departing from the invention. Of course, any desired or suitable truncation method or no truncation method may be used without departing from the invention.

In at least some examples of the invention, the electronic ink used to provide the document title or file name (or other information) will be resized (if necessary) to fit into a predetermined field size for this information. For example, when a user enters electronic ink into an inking area to provide a document title or file name (e.g., in inking areas 602, 706, and 808 discussed above), the resulting ink title (or other information) will have an overall height, an overall width, and a bounding box size. Then, in at least some examples of the invention, when displayed in a list or other area of the interface by the operating system, the ink representing the title (or other information) may be uniformly resized such that its overall height will fit within the allotted height of the display field. Then, if necessary, the ink's overall width may be truncated to fit in the allotted width of the display field (e.g., as described above in conjunction with FIG. 10). As another alternative, the width of the ink title or other information field could be preset, the ink representing the title (or other information) may be uniformly resized such that its overall width will fit within the allotted width of the display field, and then the height of the ink could be truncated or cropped (from the top or bottom or both) to fit within the predetermined height (e.g., including use of the fading method described above in conjunction with FIG. 10, except in a vertical manner rather than a horizontal manner). Such systems and methods may be particularly suitable for use with languages written and/or read in a vertical manner. Other suitable ways of determining an appropriate size for the ink title or other information in a given field may be used without departing from the invention.

Ink titles or other information also may be stored and/or rendered in any color without departing from the invention. For example, the ink color used for the title or other information may correspond to the color originally used by the user in writing the information (and the background color may automatically correspond to the background color used by the user or to a default, contrasting background). As another example, all ink titles or other information may be stored in a predetermined, default color selected by the operating system, e.g., as monochrome ink without a stored background color or foreground color (in this manner, because the operating system selects the colors of the ink and background, there is no need to worry that a user's specific ink color choices will conflict with or inadequately contrast from the system background color in use and/or that the user's color selections will contrast with another user's color selections (e.g., if the document or file is sent to or called up by another user)). For example, in this arrangement, the ink color may correspond to the color of the machine-generated text that it is replacing (i.e., if the machine-generated text would have been white on a black background, then the ink title or other information also will be white on black). As still another alternative, the user may be given choices for the ink color of all titles, and the system could then select an appropriately contrasting background color. The ink title colors also may change, in at least some examples of the invention, depending on user choices, the default settings of the operating system on which it is being rendered, etc. Any system or method for selecting the ink and background colors for the titles may be used without departing from this invention.

FIG. 11 illustrates example architecture 1100 useful in displaying ink titles or other information by operating systems in accordance with at least some examples of the invention. Before an ink title or other information can be displayed by the operating system, the electronic ink corresponding to the desired information must be entered into the system, as described above. As is known in the art (for example, in systems and methods for accepting electronic ink in pen-based computing systems operating Microsoft Corporation's Windows XP Tablet PC Edition™ software operating system), the ink for the file name or other information may be stored in an "ink serialized format" or "ISF." As mentioned above, the electronic ink title or other information also may be stored as a metadata property associated with a specific file or document. Of course, any other suitable or desired format(s) for storing electronic ink data may be used without departing from the invention.

As shown in FIG. 11, when new files or documents are stored on systems and in methods according to at least some examples of the invention ("File 1" and "File 2" in the illustrated example), new metadata properties 1102 and 1104 are defined for these files (an "Ink Title ISF" property) that will contain a set of ink strokes corresponding to the title (or other information) in ink serialized format. Additionally, in at least some examples, a parallel property 1106 and 1108 in an enhanced metafile format (e.g., an "Ink Title EMF" property) also may be defined and associated with the document for use on systems that cannot read or write ink from ink serialized format data (enhanced metafile format or "EMF" is a standard drawing format known in the art). These properties optionally may be promoted into a data performance cache 1110 (such as "WinFS"), which may be used to accelerate retrieval of the data corresponding to the ink titles (or other information).

When called upon to render an ink title, a piece of code (e.g., an "Ink Extractor" code 1112) will convert the ISF or EMF data corresponding to the title or other information (either from the performance cache 1110 or directly from the properties stored in or associated with File 1 or File 2) to bitmaps of specified dimensions (as generally described above). Then, when a file listing is being prepared, a File Listing Engine 1114 (such as a "DefView" object) will query files to be included in the listing for ink titles as it loads a folder corresponding to the desired list. ("DefView" is a Windows® operating system component that extracts information from a file list (the Windows® operating system is commercially available from Microsoft Corporation of Redmond, Wash.)). When files having ink titles are found, the File Listing Engine 1114 will build an Image List with the ink titles and pass this information to a List Display component 1116 (such as "ListView," a conventional Windows® operating system component). The List Display component 1116 will then display the ink titles at the appropriate location in place of the text file names in the list being displayed.

Of course, many variations in the specific architecture for providing the electronic ink file names and other information in the objects managed by the operating system may be used without departing from the invention. For example, the performance cache 1110 may be omitted if desired. The system illustrated in FIG. 11 is merely one example of a possible architecture.

Finally, the present invention also relates to computer-readable media including computer-executable instructions stored thereon for performing various methods and/or for use in various systems, including the systems and methods described above. The computer-readable media may constitute computer-executable instructions stored on the various specific examples of computer-readable media described above.

V. CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A computer system, comprising:
an input system that receives a file save command;
a rendering system for rendering a file save interface in response to the input system that receives the file save command, the input system is configured to receive in electronic ink format a property value of a document or file as well as a format policy of the property value on or accessible by the computer system in the file save interface, the format policy regulates a manner of rendering for the property value with regard to machine-generated text or electronic ink;
a storage system that stores the property value and format policy of the document or file; and
an access system that allows the operating system to access the stored property value and policy,
wherein the rendering system renders the stored property value in accordance with the format policy as part of a file preview operation, the rendering system converts the property value into a machine-generated text when the format policy dictates rendering of the property value should be of a machine-generated text, the file review discloses a limited information portion of the document or file, and the property value in electronic ink format includes an electronic ink filename for the document or file.

2. A computer system according to claim 1, wherein the input system is activated in response to a command from an application program requesting activation of electronic ink input with respect to at least one document or file in the application program.

3. A computer system according to claim 1, wherein the input system is further configured to receive from a user a change to the property value associated with the document or file.

4. A computer system according to claim 1, wherein the property value includes an electronic ink author identification.

5. The method of claim 1, further comprising disclosing the file preview in accordance with the policy.

6. The method of claim 5, the file preview includes at least two functions.

7. The method of claim 6, one of the functions includes expanding the file preview into the file.

8. The method of claim 1, the format policy dictates rendering in a machine-generated text in one instance and rendering in electronic ink format in another instance.

9. The method of claim 1, the rendering system collects a user preference that is used to manipulate the format policy in at least one instance.

10. A computer system according to claim 1, wherein the input system is configured to receive the property value from a touch-sensitive display or a proximity-sensitive display that receives user input by detecting a user's finger.

11. A method, comprising:

receiving a file save command;

displaying a file save interface responsive to receiving the file save command;

receiving in electronic ink format in the file save interface a property value of a document or file on or accessible by a computer;

storing the property value of the document or file in electronic ink format for a later display on a display-interface in electronic ink format;

providing operating system access to the stored property value in electronic ink format;

obtaining a request to render the stored property value, the request originates from a user and includes an appeal for a rendering manner that comprises an appeal to render the property value in electronic ink format or an appeal to render the property value in machine-generated text;

determining a format manner upon how to render the stored property value, wherein determining the format manner includes evaluating the request to appreciate the appeal concerning how to render the stored property value; and rendering the stored property value in accordance with the determined format manner as part of a file preview operation, the file preview operation filters information of the document or file such that a portion less than a whole of the document or less than a whole of the file is part of the file preview, wherein the property value in electronic ink format includes an electronic filename for the document or file.

12. A method according to claim 11, further comprising:

receiving input from an application program activating an electronic ink input system for receiving the property value in electronic ink format associated with the document or file.

13. A method according to claim 11, further including receiving from a user changes to the property value in electronic ink format associated with the document or file.

14. A method according to claim 11, wherein the property value in electronic ink format includes an electronic ink author identification, and an electronic ink comment.

15. The method of claim 11, further comprising disclosing the file preview in accordance with the format manner.

16. The method of claim 15, the file preview includes at least two functions.

17. The method of claim 16, one of the functions includes expanding the file preview into the file or document.

18. The method of claim 11, the manner is automatically determined.

19. A method according to claim 11, wherein the property value is received from a touch-sensitive display or a proximity-sensitive display that receives user input by detecting a user's finger.

20. A system, comprising:

means for receiving a file save command;

means for displaying a file save interface responsive to means for receiving the file save command;

means for receiving in electronic ink format in the file save interface a property value of a document or file on or accessible by a computer;

means for determining a format for retention of the electronic ink format, the format is a first format of electronic ink format or a second format of machine-generated format;

means for storing the property value of the document or file in the determined format for a later display on a display-interface in electronic ink format and retaining metadata pertaining to conversion of the format to the first format if saved in the second format or conversion of the format to the second format if saved in the first format;

means for providing operating system access to the stored property value;

means for obtaining a request to render the stored property value;

means for establishing a format upon how to render the stored property value based upon the request;

means for determining if the established format is the same as the saved format and converting the format upon a negative determination; and means for rendering the stored property value in accordance with the determined format as part of a file preview operation, the file preview operation filters information of the document or file such that a portion less than a whole of the document or less than a whole of the file is part of a file preview, the property value in electronic ink format includes an electronic filename for the document or file.

21. A system according to claim 20, wherein the means for receiving in electronic ink format in the file save interface a property value is configured to receive the property value from a touch-sensitive display or a proximity-sensitive display that receives user input by detecting a user's finger.

* * * * *